(12) United States Patent
Neufang

(10) Patent No.: US 9,533,360 B2
(45) Date of Patent: Jan. 3, 2017

(54) METHOD AND TOOL FOR ROUGHENING AN INNER SURFACE OF A CYLINDRICAL BORE

(71) Applicant: Daimler AG, Stuttgart (DE)

(72) Inventor: Oliver Neufang, Blaustein (DE)

(73) Assignee: Daimler AG, Stuttgart (DE)

( * ) Notice: Subject to any disclaimer, the term of this patent is extended or adjusted under 35 U.S.C. 154(b) by 10 days.

(21) Appl. No.: 14/408,115

(22) PCT Filed: Jul. 26, 2013

(86) PCT No.: PCT/EP2013/002226
§ 371 (c)(1),
(2) Date: Dec. 15, 2014

(87) PCT Pub. No.: WO2014/019666
PCT Pub. Date: Feb. 6, 2014

(65) Prior Publication Data
US 2015/0174668 A1    Jun. 25, 2015

(30) Foreign Application Priority Data

Jul. 31, 2012  (DE) .......................... 10 2012 015 163

(51) Int. Cl.
*B23B 35/00*    (2006.01)
*B23B 41/12*    (2006.01)
(Continued)

(52) U.S. Cl.
CPC .............. *B23B 41/12* (2013.01); *B23B 29/03* (2013.01); *C23C 4/02* (2013.01); *B23B 35/00* (2013.01);
(Continued)

(58) Field of Classification Search
CPC .......... B23B 35/00; B23B 41/12; B23B 41/16; B23B 41/06; B23B 2220/44; B23B 2220/445; B23B 2270/54; B23B 2215/24; B23B 2215/242; Y10T 29/49995; Y10T 29/49886

See application file for complete search history.

(56) References Cited

U.S. PATENT DOCUMENTS

| 3,164,039 | A | 1/1965 | Woods |
| 6,398,634 | B1 * | 6/2002 | Gundy .................... B23B 51/00 451/541 |

(Continued)

FOREIGN PATENT DOCUMENTS

| DE | 60131096 T2 | 2/2008 |
| DE | 102006045275 B3 | 2/2008 |

(Continued)

OTHER PUBLICATIONS

Machine translation of France patent publication: FR 2957541 A1, "Method for machining cylindrical barrel in cylinder block of internal combustion engine of car to manufacture block, involves boring barrel to obtain dimensions of part of barrel and degradation of surface of part of internal face of barrel", Lampis, D. et al., Sep. 23, 2011.*

(Continued)

*Primary Examiner* — Daniel Howell
*Assistant Examiner* — Chwen-Wei Su
(74) *Attorney, Agent, or Firm* — A. Michael Tucker; Stephan A. Pendorf; Patent Central LLC

(57) ABSTRACT

A method for roughening an inner surface (8) of a cylindrical bore (9), in particular a running surface in a cylindrical bore or cylinder liner of an internal combustion engine. A rotating tool (1) is moved in a translatory manner in the axial direction of the cylindrical bore (9) and has a radial cutting head (7). A chip (12) is lifted off by at least one cutting edge of the radial cutting head (7) and is broken away via a further edge or face of the radial cutting head (7), in order to (Continued)

Figure 1:
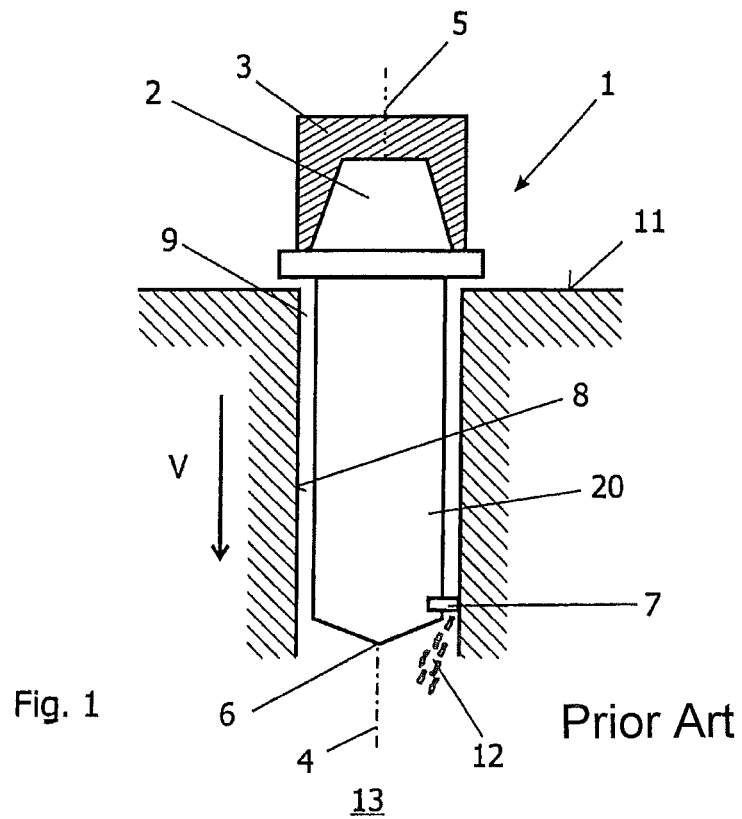

produce the roughened surface. The tool (1) is introduced into the cylindrical bore (9) or is passed through it, after which a positioning of the tool (1) in the radial direction takes place, and after which the removal of the material takes place via the rotating tool (1) when the tool is moved in its advancing direction (V) out of the cylindrical bore. A tool (1) is also claimed.

18 Claims, 2 Drawing Sheets

(51) Int. Cl.
*B23B 29/03* (2006.01)
*C23C 4/02* (2006.01)

(52) U.S. Cl.
CPC ........ *B23B 2215/24* (2013.01); *B23B 2220/44* (2013.01); *B23B 2220/445* (2013.01); *B23B 2229/08* (2013.01); *B23B 2250/12* (2013.01); *Y10T 29/49886* (2015.01); *Y10T 29/49995* (2015.01); *Y10T 408/03* (2015.01); *Y10T 408/45* (2015.01)

(56) References Cited

U.S. PATENT DOCUMENTS

| | | |
|---|---|---|
| 2003/0010201 A1 | 1/2003 | Takahashi et al. |
| 2007/0069042 A1* | 3/2007 | Tujii .................... B05B 3/02 239/84 |
| 2008/0099220 A1 | 5/2008 | Cohen et al. |
| 2009/0297283 A1 | 12/2009 | Takashima et al. |
| 2010/0031799 A1* | 2/2010 | Ast .................... B23B 27/06 83/875 |
| 2011/0049505 A1 | 3/2011 | Grabowski et al. |
| 2012/0121348 A1* | 5/2012 | Eckert .................... B23B 41/12 408/1 R |
| 2012/0317790 A1 | 12/2012 | Flores et al. |

FOREIGN PATENT DOCUMENTS

| | | |
|---|---|---|
| DE | 102009028040 A1 | 3/2011 |
| DE | 102012207455 A1 | 12/2012 |
| EP | 1859881 A1 | 11/2007 |
| EP | 1916055 A2 | 4/2008 |
| EP | 1759133 B1 | 10/2008 |
| FR | 2957541 A1 | 9/2011 |
| JP | 2006026713 A | 2/2006 |
| JP | 2010201554 A | 9/2010 |
| JP | 2010228095 A | 10/2010 |
| WO | 2006097981 A1 | 9/2006 |

OTHER PUBLICATIONS

International Search Report in International Application No. PCT/EP2013/002226 dated Oct. 28, 2013.

Japanaese Office Action (with English language translation) dated Jan. 5, 2016, in Japanese Application No. 2015-524662.

* cited by examiner

METHOD AND TOOL FOR ROUGHENING AN INNER SURFACE OF A CYLINDRICAL BORE

The invention relates to a method to roughen an inner surface of a cylindrical bore according to the type defined in more detail in the preamble of claim 1. Furthermore, the invention relates to a tool to roughen an inner surface of a cylindrical bore according to the type defined in more detail in the preamble of subordinate claims 8 and 10. A tool of this type is known, for example, from DE 102012207455 A1.

Methods and tools to roughen an inner surface of a cylindrical bore are known from prior art. By way of example, for this purpose, DE 601 31 096 T2 and EP 1 756 133 B1 are referred to. The tools or methods according to these two publications use a tool that is able to be driven to rotate in the axial direction, having a radial cutting head which is moved into the cylindrical bore in such a way that it carries out machining processing with the radial cutting head, after which the shaving lifted off during material removal is broken off via a further blade or an edge or surface of the same radial cutting head. Due to the machining processing with the breaking off of the shaving which has been lifted off, which subsequently occurs in the same work process, a roughened surface is achieved which has a plurality of undercuts.

A roughened surface produced in this way is particularly well suited to offer an ideal hold for a coating that is later applied to this surface. It is therefore used in particular for the preparation of cylinder bores or bores in cylinder liners of combustion engines in order to provide a correspondingly roughened surface which is then provided by means of a coating in order to optimise the tribological properties between the wall of the bore and a piston which later runs therein. Here, the coatings can preferably be thermal coatings which are applied to the surfaces which are correspondingly prepared by the roughening, in particular by plasma spraying, electric arc wire spraying or similar.

The methods described in prior art are thus very well suited for achieving a roughening of the inner surface of the cylinder bore in a work process and thus with a very short processing time, which later ensures very good adherence of the coating. The methods and tools are therein, however, comparably limited in their application as they require processing with an arrangement of the axial alignment of the tool and the cylindrical bore in the vertical direction or only inclined at a small angle from the vertical by the processing and the breaking of the shavings when immersed in the cylindrical bore. Only hereby is it ensured that the shavings arising during the processing procedure fall downwards into the cylindrical bore or out of the cylindrical bore. A corresponding processing of the machine tools with a horizontal spindle, as has been shown in countless tests, is extremely difficult in practice, since shavings can remain lying in the region of the processed surface and can then lead to a corresponding jamming of the tool in the cylindrical bore during the processing procedure. As well as the problems connected to this with regard to the tool and the processing time, this also in general leads to serious problems, to the effect that the roughened surface that has already been produced is impaired in its surface quality by the shavings or that the shavings, in particular when working with aluminium, aluminium alloys or other light metal alloys, tend to smear. The desired roughened surface is also hereby impaired and a thermal coating applied later cannot sufficiently adhere here, which can lead to serious quality problems.

The object of the present invention now consists in specifying a method and a tool for this purpose, which prevent these disadvantages and ensure a simple, reliable and cost-effective production process.

According to the invention, this object is solved by the method having the features in the characterising part of claim 1. Advantageous developments of the method according to the invention result from the dependent sub-claims. The object is furthermore solved by a tool having the features in the characterising part of subordinate claim 8 or 10. Advantageous developments and embodiments of the tool result from the dependent sub-claims.

In the method according to the invention, is now the case that, other than in methods in prior art, the processing does not occur in such a way that the radial cutting edge of the tool is guided in its feed direction over portions of the surface which have already been processed, but rather that the tool is firstly driven into or through the cylindrical bore, wherein preferably no or only minimal material removal occurs on the inner surface of the cylindrical bore due to an eccentric positioning.

Then the tool is positioned in the desired manner; a cutting edge of the radial cutting head is therefore adjusted to the intended degree for production of the inner surface of the cylindrical bore. Subsequently, the actual processing of the inner surface of the cylindrical bore occurs with the radial cutting head in that this is driven out of the cylindrical bore with its feed direction and thus processes the surface in the desired manner and removes material. Due to this inversion of the processing direction, such that the processing only occurs when driving the tool out of the cylindrical bore, it is achieved that, during the processing, falling shavings cannot come to lie between the tool and the surface that has already been processed, but rather that the processed surface is correspondingly free. Shavings, which possibly remain lying there, can be removed simply without leading to a jamming and smearing of the shavings into the roughened surface by the tool itself. Due to the method according to the invention, the danger of shavings which remain in the region of the already processed surface and which cause jams, which can impair the already processed surface due to an interaction of the shavings with the tool, is completely prevented. The corresponding advantage for this method is therefore that a very good surface quality can be achieved, even if the tool is not positioned in the vertical direction, but rather if tool and bore are aligned in the horizontal direction. This enables the use of machine tools which are equipped with horizontal spindles. These are constructed to be clearly simpler and more cost-effective compared to the machine tools having vertical spindles. Furthermore, machining tools having horizontal spindles which [lacuna] usual machine tools in transfer lines in modern production technology. The method according to the invention helps to simplify the processing of the inner surface of the cylindrical bore and to enable it to be simple and cost-effective on conventional transfer lines. Additionally, advantages result during the device construction, in particular if the inner surfaces of the cylindrical bore are the inner surfaces of cylinders in crankcases of combustion engines in a V arrangement. These must be held with far less effort during use with machine tools having a horizontal spindle and must be positioned with respect to the machine such that, as well as a cost saving for the machine itself—at least in this case—a clear cost saving for the device construction to hold the components to be processed can also be achieved.

In a highly favourable embodiment of the method according to the invention it is thus provided that the region of the radial cutting head is provided with a flushing medium for flushing and/or cooling. Such a provision of the region of the radial cutting head with a flushing medium ensures, on the one hand, a cooling in the region in which the processing takes place, and on the other hand that shavings which fall and are lifted off by the special construction of the radial cutting head and are then broken off are flushed away before they can be fixed in the region of the roughened surface, such that the secure and reliable processing of the surface to be roughened is further improved without remaining or jammed shaving remains.

According to the purpose of use of the method according to the invention, the flushing medium can, for example, be a cooling and lubricating emulsion as is known generally in metal processing and is usual. This would be particularly useful for use in the field of cylinder liners made from grey cast iron or similar. The roughened surface must then subsequently be freed of the remnants of the flushing medium, for example degreased, in order to allow a good and secure adhesion of the later coating on the roughened surface.

In particular with the use of light metal alloys as a tool into which the cylindrical bores are inserted, it is therefore provided, according to a particularly favourable and advantageous development of the method according to the invention, that an oil-free and at least extensively dry gas is used as a flushing medium. Such flushing and cooling with a gas, preferably with oil-free pressurised air, likewise enables typically sufficient cooling for the processing of the light metal alloys and allows a very good flushing away of resulting shavings. Due to the oil-free and dry or at least extensively dry gas, a contamination of the processed surface with undesired materials is completely prevented here, such that a cleaning step after the processing of the surface and before a downstream thermal coating of the surface can be saved. As well as the saving of an additional processing step, the risk of the roughness profile disadvantageously changing during cleaning of the roughened surface and thus the adhesion of the thermal coating being impaired is hereby reduced.

In a further highly advantageous embodiment of the method according to the invention, it can now furthermore be provided that a finishing processing of the inner surface of the cylindrical bore is carried out via a further radial cutting head in the feed direction, in the same work process, before the radial cutting head for roughening the inner surface. Such a combination of finishing and subsequent roughening in a single work process can be particularly favourable and efficient as an additional work process can hereby be saved. Particularly with a feed direction that is reversed according to the invention compared to the prior art, this can be designed particularly efficiently, as the shavings falling during finishing, in particular during use of a horizontal spindle, can be brought out in the feed direction, for example by a suitable flushing medium supply. Nevertheless, shavings remaining between the tool and the surface are potentially not critical here, as this region must still be processed by the subsequent finishing process. The roughening of the inner surface of the cylindrical bore in the described manner occurs in the feed direction after the finishing process via a second radial cutting head. Therein falling cuttings are, as has already been described, flushed out via the processed surface or can also remain lying there, which is not critical, as the tool has already been driven out of the region of this surface.

A tool according to the invention is constructed according to claim 8 such that, as well as a first radial cutting head for roughening the inner surface of the cylindrical bore, a further radial cutting head is present to finish the inner surface of the cylindrical bore, which is arranged between a tool receiver and the radial cutting head in the axial direction to roughen the inner surface of the cylindrical bore. This tool having the two radial cutting heads, on the one hand to finish, and on the other hand to roughen, is therein formed in such a way that this can preferably be used according to the method according to the invention, so with a feed direction during the material removal towards the tool receiver. The tool can therefore in particular be guided into or through the cylindrical bore, can be positioned accordingly and can then carry out the desired material removal during driving out from the cylindrical bore. As the radial cutting head for finishing is arranged first from the viewing direction from the tool receiver, and the radial cutting head for roughening the inner surface of the cylindrical bore is arranged after this from the viewing direction from the tool receiver, a processing results which firstly finishes the surface to the desired extent in a single work step, in order to then roughen it.

The tool according to the invention is distinguished in that at least one flushing medium line is provided, each having a flushing medium outlet corresponding to each of the radial cutting heads.

The flushing medium outlet which corresponds to the radial cutting head for roughening the inner surface of the cylindrical bore is formed here in such a way that it has a directional component in the direction of the tool tip. Flushing medium which exits via this flushing medium outlet thus flushes away shavings in the direction of the tool tip, so against the feed direction, from the roughened and thus processed surface, such that an adherence and jamming of shavings is securely and reliably prevented. The other flushing media outlet is arranged in such a way that this corresponds to the radial cutting head for finishing the inner surface of the cylindrical bore, and indeed in such a way that this has a directional component in the direction of the tool receiver. Shavings falling during finishing are thus flushed away in the direction of the tool receiver, so in the direction of the feed direction. They reach between the tool or tool shaft and the walls of the cylindrical bore from this. The jamming of the shavings is extensively prevented by the flushing medium exiting via the correspondingly directed flushing medium outlet or is at least reduced to a minimum residual number of possibly jammed shavings. Furthermore, it is hereby prevented that the shavings from the finishing reach the region of the radial cutting head for roughening of the surface and the region of the roughened surface, and can cause corresponding damage there. Due to the not yet roughened surface in the region of the shaft of the tool between the tool receiver and the radial cutting head for finishing, the shavings are not critical here. Should they, contrary to expectation, nevertheless be impressed into the surface by the tool, then an impairment of the surface is removed again during subsequent finishing. It is therefore crucial that the shavings not reach the region of the roughened surface or the radial cutting head for roughening; this is ensured by the corresponding alignment of the flushing medium outlet in the region of the radial head for finishing.

In a highly favourable embodiment of the tool according to the invention, it is therein furthermore provided that the two radial cutting heads are arranged to be offset with respect to each other in the peripheral direction at an angle of up to 120°, preferably at an angle of up to 90°. The two radial cutting heads are arranged to be offset to each other at a known angle in the peripheral direction, so onto the tool when seen in a top view, for example from the tool tip. This ensures the possibility to position the two radial cutting heads in the axial direction comparably densely next to one another in the sequence described above. Due to the fact that the angle is formed to be smaller than 120° in the peripheral direction, preferably smaller than 90°, the possibility nevertheless arises to place the tool with its rotational axis eccentrically in the cylindrical bore in order to be able to position this during driving in without contact with the inner surface of the cylindrical bore or at best with minimal contact. Only then is the tool positioned in the desired manner, typically by the positioning taking place in such a way that the rotational axis of the tool and the central axis of the cylinder bore are arranged congruently. The tool is then pulled out of the cylinder bore in the feed direction and thereby ensures the desired material removal, in particular the finishing on the one hand and the roughening of the surface on the other hand which occurs after this in the same work step.

In an alternative embodiment, the tool according to the invention can provide, according to claim 10, a third radial cutting head for trimming potentially protruding shavings, which is arranged in the axial direction between the radial cutting head for roughening the inner surface of the cylindrical bore and the tool tip. This radial cutting head is arranged to be offset in the peripheral direction to any of the two other cutting heads. This additional radial cutting head as a trimming blade is only an additional security instrument which correspondingly trims potentially protruding remains of the broken-off shavings, such that these do not project so far over the surface of the cylindrical bore that this could possibly protrude over a thermal coating that is applied later. In order to be able to position the three radial cutting heads correspondingly tightly in the axial direction next to one another in the described sequence, this further radial cutting head for the trimming of potentially remaining protrusions of shavings is also arranged to be offset accordingly in the peripheral direction.

In an advantageous development of this, it is therein provided that all three radial cutting heads are arranged to each be offset to one another in the peripheral direction at an angle, wherein the sum of the angles amounts to a maximum of 120°, preferably a maximum of 90°. Despite the three individual radial cutting heads, it is then furthermore ensured that the tool can be positioned eccentrically with the radial cutting heads, in order to thus drive this into the cylindrical bore or possibly also to be able to drive it out, without a material removal or an impairment of the surface of the cylindrical bore occurring.

In an advantageous embodiment of this, it is furthermore provided that the third radial cutting head is formed without a flushing medium supply. A flushing medium or coolant supply of the third radial cutting head, which only serves to trim potentially remaining protrusions of shavings, can typically be dispensed with as this radial cutting head used for trimming is not used very frequently and in the case of use, is only used for a short time and with minimum cutting surface. A cooling and flushing can therefore be dispensed with without disadvantages hereby resulting for the desired roughened surface. Dispensing with a further flushing medium outlet in the region of the tool enables, however, a clear simplification of the tool having the corresponding advantageous for tool costs and the production of the tool.

The method according to the invention can preferably be used to roughen an inner surface of a cylindrical bore as preparation for a thermal coating, in particular by means of electric arc wire spraying. Specifically for this use purpose, the roughening in the manner referred to, which can be used simply and efficiently by the method according to the invention on machining tools having a horizontal spindle, offers clear advantages as it ensures a very good adhesion of a thermal coating. The use of the method can thus particularly occur for inner surfaces made from a non-iron metal, in particular aluminium or an alloy having the non-iron metal. Above all, in the case of non-iron metals, in particular in the case of light metals such as, for example, aluminium or alloys thereof, the thermal coating of cylinder working surfaces in combustion engines is, for example, of considerable significance, since an improvement in the tribological properties can be achieved in the combustion engine by the thermal coating, without the advantages of the light metals with regard to weight, production costs and similar having to be dispensed with. Above all, for these constructions, the method according to the invention is therefore particularly well suited.

As has already been explained multiple times, both the method according to the invention and the tool according to the invention can preferably be used on a machining tool having at least one horizontal spindle to receive the tool. Such horizontal spindles are correspondingly simpler and more cost-effective than comparable machining tools having a vertical spindle. Furthermore, machining tools having horizontal spindles are generally known and usual in typical transfer lines, for example in the field of the automobile industry, such that without great conversion effort, the processing can be transferred into such a transfer line which in turn creates synergies with regard to the production and factory planning and thus enables corresponding cost advantages with respect to the highly expensive machines above having a vertical spindle.

Further advantageous embodiments of the method according to the invention as well as of the tool according to the invention result from the remaining dependent subclaims and are made clear by means of an exemplary embodiment which is described in more detail below with reference to the figures.

Figure 2:
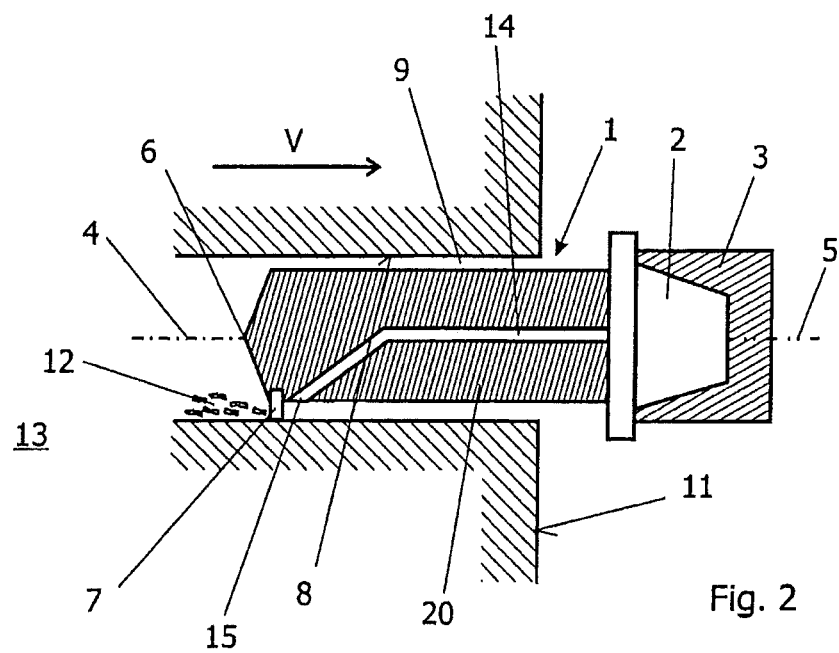
Figure 3:
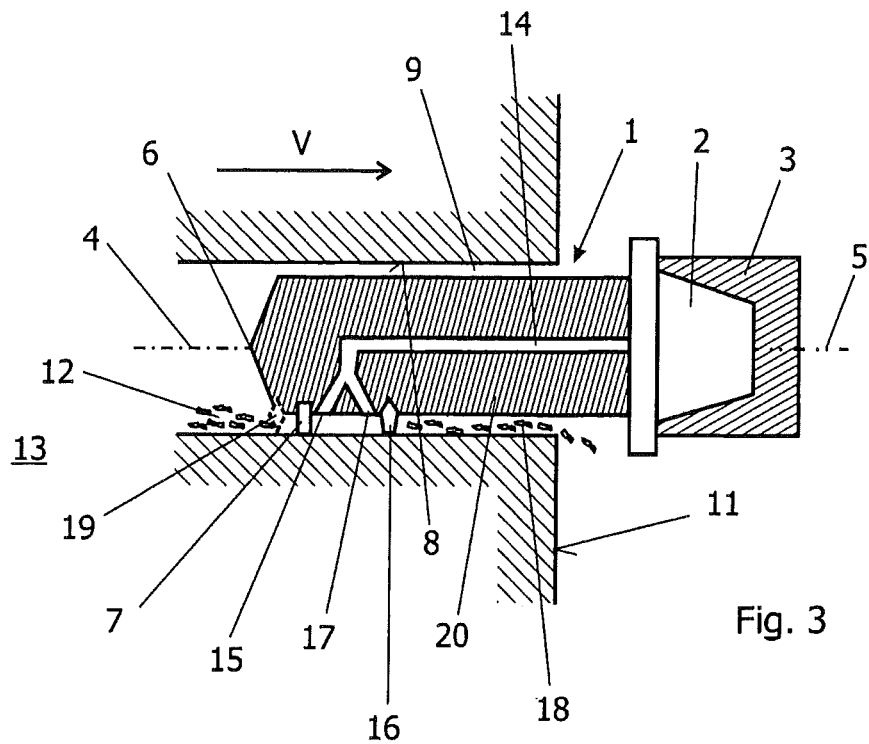
Figure 4:
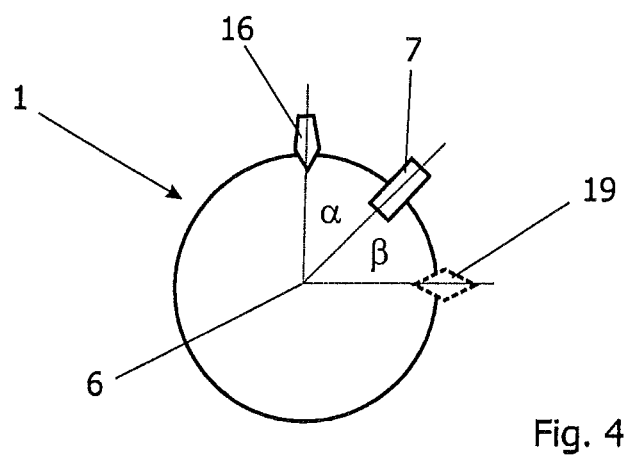

There are shown:

FIG. 1 a schematic depiction of a tool and of a method to roughen an inner surface of the cylindrical bore according to prior art;

FIG. 2 a schematic depiction of a tool and of a method to roughen an inner surface of a cylindrical bore according to the invention in a first embodiment;

FIG. 3 a schematic depiction of a tool according to the invention and of a method to roughen an inner surface of a cylindrical bore according to the invention in a second embodiment; and FIG. 4 a top view onto the tool depicted in FIG. 3.

In the depiction of FIG. 1, a construction according to prior art can be recognised. A tool 1 is received with a tool receiver 2 in a corresponding counterpart 3 of a machining tool that is not depicted here in its entirety. A central axis 4 of the tool 1 as well as an axis 5 symbolising the spindle of the machining tool are therein arranged to be aligned with each other. The machining tool is formed with a spindle which runs vertically and correspondingly with an axis 5 of its spindle which runs vertically. Such machining tools are also referred to as vertical spindles. The tool 1 itself has a tool tip 6 on the axially opposite side of the tool receiver 2. A radial cutting head 7 indicated according to principle is situated in the region of this tool tip 6 which is used to roughen an inner surface 8 of a cylindrical bore 9. The radial cutting head 7 for roughening the inner surface 8 is subsequently referred to for simplicity as a roughening blade 7.

The cylindrical bore is, in particular, the cylinder bore in an indicated crankcase 10 of a combustion engine made from a light metal alloy, in particular an aluminium alloy. The inner surface 8 of the cylindrical bore 9 is roughened via the roughening blade 7 of the tool 1, in order to ideally prepare this for a thermal coating, for example by plasma spraying or in particular by electric arc wire spraying. By roughening the inner surface 8, a very good adhesion of the thermal coating is achieved, as the roughening leaves behind a surface by means of lifting and subsequent breaking of the lifted-off shavings, which has countless undercuts onto which the material of the thermal coating can clamp accordingly.

The feed direction referred to by V of the tool 1 during the material removal, so the processing of the inner surface 8 by the roughening blade 7, is therein such that the tool 1 is driven into the cylindrical bore 9 by a cylinder head separating surface 11 which is arranged at the top of the depicted exemplary embodiment, and therein the material removal occurs. The shavings 12 arising during roughening fall downwards, out of the cylindrical bore 9, in this arrangement due to gravity, in the direction of a crankshaft space 13. The disadvantage of this construction according to prior art consists substantially in that it is limited to the alignment depicted here of the axis 4 of the tool 1 which coincides during the processing with the rotational axis of the cylindrical bore 9, and in particular the axis 5 of the spindle of the machining tool. If the comparably complex and expensive vertical spindle as a machining tool were exchanged for a horizontal spindle, then the shavings 12 would no longer fall downwards into the crankshaft due to gravity, but rather could at least partially come to lie between a shaft 20 of the tool 1 and the already-roughened inner surface 8 and would be jammed here. This would, on the one hand, lead to an impairment of the tool 1 and the accuracy of the processing, and would, on the other hand, at worst, interrupt processing. In any case, it would lead to an impairment of this inner surface 9 and thus to a worsening of the roughened inner surface 8 due to a jamming of the shavings 12 between the shaft 20 of the tool 1 and the already processed inner surface 8 of the cylindrical bore 9, which could later then later lead to an insufficient adhesion of the thermal coating. This would represent a serious disadvantage, such that one is limited to the use of a vertical spindle as a machining tool for the construction described here and the accompanying method.

In the depiction of FIG. 2, a comparable construction is now to be recognised, wherein this is formed with a horizontal arrangement of the axis 5 of the spindle of the machining tool and thus can be implemented on a so-called horizontal spindle as a machining tool. This brings decisive advantages to the production, as horizontal spindles are able to be constructed more simply and robustly and therefore are correspondingly more cost-efficient. Furthermore, in the usual transfer lines, such as are used, for example, in the production of the automobile industry, horizontal spindles having one or in particular several spindles are the usual types of machining tools, such that the construction depicted in FIG. 2 enables a simple and cost-efficient production. This is achieved by the feed direction V being reversed with respect to the construction according to prior art. Otherwise, the construction and the reference numerals used to describe the construction largely correspond to the details already described in FIG. 1. Due to the fact that the tool 1 is now typically driven eccentrically into the cylindrical bore 9 or is possibly also driven through this up to the crankshaft space 12, during the immersion of the tool 1 into the cylindrical bore 9, no processing occurs such that, hereby, no shavings also fall, which can remain lying between the shaft 20 of the tool 1 and the inner surface 8 and can be jammed there. Only after this is the tool 1 brought into the corresponding position with its axis 4, in particular in such a way that the axis 4 is congruent with an axis having the cylindrical bore 9. Then, the actual processing begins by the tool 1, which rotates around its axis 4 during the processing, as also in prior art, in this case being driven out of the cylindrical bore 9 in the feed direction V. Potential shavings 12 do thus not fall between the shaft 20 and the inner surface 8 of the cylindrical bore 9, but at best lie in the region on the already roughened surface of the inner surface 8 which is no longer covered by parts of the tool 1, such that a jamming and possibly a smearing of the shavings 12 in the already roughened surface does not occur in a secure and reliable manner. The processing is hereby also possible in the shown manner on processing machines having a horizontal axis 5 of their spindle, wherein the method is naturally also furthermore fundamentally suitable for machines having a vertical spindle.

A further improvement of the shaving removal enables a flushing medium line 14 having a flushing medium outlet 15 in the region of the roughening blade 7. Due to the supply of a suitable flushing medium, it can on the one hand be cooled during the processing procedure and, on the other hand, a flushing away of the resulting shavings can be ensured. The flushing medium is therein supplied in a known manner by the tool receiver 2 and the shaft 20 of the tool 1 via the machining tool which is not shown. Fundamentally, different flushing media or even coolants and flushing media are suitable, as are known from prior art. The use of oil-containing emulsions can be useful here, in particular for the processing of cylindrical bores 9 or cylinder liners made from grey cast iron or other iron materials, as intensive cooling is necessary here, as well as the flushing away of the shavings. In the case of the use of a conventional coolant, however, a time-consuming cleaning of the roughened surface then occurs, in order to completely remove residues and thus to ensure the good adhesion of the later thermal coating on the inner surface 8 of the cylindrical bore. This is an additional time-consuming work step which is possibly also accompanied by an undesired impairment of the roughened surface. It is therefore desirable, and in particular for the processing of light metal alloys, if an oil-free and dry or extensively dry compressed air or potentially also another suitable gas is used as a flushing medium. Hereby, a sufficient cooling in the processing of light metal alloys is achieved and the flushing medium can, in particular, assume the task of flushing away the resulting shavings 12 accordingly and minimising the risk of an impairment of the already completely roughened surface by the shavings 12.

In the depiction of FIG. 3, a further possible embodiment of the tool 1 is now to be recognised analogously to the depiction in FIG. 2. Also here, the feed direction in turn runs from the region of the crankshaft space 13 towards the cylinder head separating surface 11 and the tool 1 is substantially implemented analogously to the construction that has already been described. Contrary to the tool 1 described previously, the tool 1 depicted here has a further radial cutting head 16 for finishing the inner surface 8 of the cylindrical bore 9, as well as the roughening blade 7 as a radial cutting head. As a consequence of the system already described above, this radial cutting head 16 for finishing the inner surface 8 is referred to below as a finishing blade 16. The finishing blade 16 is therein arranged axially at a distance to the roughening blade 7, and indeed in such a way that the finishing blade 16 is arranged between the roughening blade 7 and the tool receiver 2. For the described feed direction V, this means that firstly the finishing blade 16 is engaged with the material enclosing the cylindrical bore 9 and finishes this to the desired extent. The inner surface 8 of the cylindrical bore 9 that is completely finished to the desired extent in this way is then roughened in the manner described above by the roughening blade 7. The finishing blade 16 and the roughening blade 7 are thus, in practice arranged, differently from how they are in the schematic depiction of FIG. 3 in the axial direction, offset with respect to one another by only by a few millimeters. In order to be able to implement such a compact construction accordingly, the roughening blade 7 and the finishing blade 16 are arranged to be offset with respect to one another by an angle $\alpha$ in the peripheral direction of the tool 1, as is to be recognised in a top view onto the tool 1 from the tool tip 6 in the depiction of FIG. 4.

The tool 1 in turn has the flushing medium line 14 to supply a coolant and/or flushing medium. Here, the flushing medium should, if possible, be oil-free and extensively dry, analogously to the embodiment described above; it can in particular be accordingly-processed pressurised air. The flushing medium outlet 15 corresponding to the roughening blade 7 is in turn arranged analogously to the depiction in FIG. 2 in such a way that the shavings 12 which fall during roughening are flushed away via the already-roughened surface of the inner surface 8, without it herein being able to lead to a jamming of the roughening shavings 12, as the already processed surface is not or not significantly covered by the shaft 20 of the tool 1. A second flushing medium outlet 17 is now formed with a directional component in the feed direction, so in the direction of the tool receiver 2. This flushing medium outlet 17 corresponds to the finishing blade 16 and, due to the directed supply of the pressurised air, ensures that the finishing shavings which fall during finishing, which are referred to below with 18, are flushed out along the shaft 20 through the cylindrical bore 9. If this functionality of the flushing out of the finishing shavings 18 were to be impaired, then finishing shavings 18 would jam accordingly between the inner surface 8 and the shaft 13, which could likewise lead to a smearing of the shavings and an impairment of the surface of the inner surface 8 in this region. In a different manner from the construction according to prior art, in which this region is already processed, this is here, however, comparably not critical due to the reversed feed direction V, as the surface in this region must still be processed and thus potential impairments during the finishing of the surface are removed again by the finishing blade 16, such that this no longer influences the quality of the processing in a disadvantageous manner after completion of the same.

In the depiction of FIG. 3, a further optional radial cutting head 19 can furthermore be recognised. This is arranged between the tool tip 6 and the roughening blade 7 in the axial direction of the tool 1 and, as can be recognised in the depiction of FIG. 4, is in turn designed to be offset in the peripheral direction with respect to the two other blades 7, 16. The radial cutting head 19 severs to trim potentially remaining protruding shavings in the region of the already-roughened surface in order to thus prevent protruding shavings or shaving remnants, which have been insufficiently broken off, from remaining, as these could perforate the later thermal coating and impair the quality thereof. According to the system described above, the radial cutting head 19 for trimming the potentially remaining protruding shavings can also be referred to as a trimming blade 19.

In the depiction of FIG. 4, it can now be recognised that the blades 7, 16, 19 arranged in the axial direction, typically offset with respect to one another by a few millimeters, are each arranged to be offset to one another in the peripheral direction of the tool 1 at a corresponding angle. As has already been described above, in the depiction of the Figure, the angle between the roughening blade 7 and the finishing blade 16 is referred to by $\alpha$. The angle between the roughening blade 7 and the optional trimming blade 19 is referred to by $\beta$ in the depiction of FIG. 4. Contrary to the depiction, it would of course also be possible to arrange the individual blades 7, 16, 19 in any other sequence in the peripheral direction. It is now important for the construction of the tool 1 that the sum of the two angles $\alpha$ and $\beta$ be smaller than 120°, preferably a maximum of 90°. This arrangement of all three blades 7, 16, 19 or, if the trimming blade 19 is not present, of the two blades 7, 16, at an angle of ideally a maximum of 90° to one another ensures the possibility of positioning the tool 1 eccentrically in the cylindrical bore 9 in order to introduce this into the bore cylindrical 9 against the feed direction V, without already carrying out, a material removal therein. Only then is the tool 1 positioned accordingly and driven out of the cylindrical bore 9 in the feed direction V, removing material.

The invention claimed is:

1. A method to roughen an inner surface (8) of a cylindrical bore (9), comprising:
   introducing into the cylindrical bore or leading through this, without removal of material, a rotating tool (1) having a radial cutting head (7) having at least one cutting edge of the radial cutting head (7),
   positioning the tool (1) in the radial direction, and
   removing material by lifting off shavings (12) via the rotating tool (1) while driving the tool (1) out of the cylindrical bore in its feed direction (V), said tool (1) being moved in a translational manner in the axial direction of the cylindrical bore (9) and said shaving (12) being broken off via the radial cutting head (7), in order to generate the roughened surface,
   wherein a finishing processing of the inner surface (8) of the cylindrical bore (9) is carried out by a further radial head (16), positioned in the feed direction (V) in the work process before the radial cutting head (7) for roughening the inner surface (8), and
   wherein a flushing medium for flushing and/or cooling is supplied with a directional component, against the feed direction (V), in the region of the radial cutting head (7) for roughening the inner surface (8), and a flushing medium for flushing and/or cooling is supplied with a directional component, in the feed direction (V), in the region of the further radial cutting head (16).

2. The method according to claim 1, wherein a material removal is carried out exclusively when driving the tool (1) out of the cylindrical bore (9).

3. The method according to claim 1, wherein the region of the radial cutting head (7) is provided with a flushing medium for flushing and/or cooling.

4. The method according to claim 3, wherein an oil-free and at least extensively dry gas is used as the flushing medium.

5. The method according to claim 4, wherein the oil-free and at least extensively dry gas is compressed air.

6. The method according to claim 1, herein potentially remaining protrusions of the broken-off shavings (12) are trimmed by a further radial cutting head (19) in the same work process, in the feed direction (V), after the radial cutting head (7) for roughening the inner surface (8).

7. The method according to claim 1, wherein it serves as preparation for a thermal coating.

8. The method according to claim 1, wherein it is used for roughening the inner surface of a cylindrical bore (9) made from a non-iron metal.

9. The method according to claim 1, wherein the inner surface (8) of a cylindrical bore (9) is a working surface in a cylindrical bore or cylinder liner of a combustion engine.

10. The method according to claim 1, wherein it serves as preparation for a thermal coating by means of electric arc wire spraying.

11. A tool (1) for roughening an inner surface (8) of a cylindrical bore (9), having
 a radial cutting head (7), for lifting off a shaving (12) and for breaking off the shaving (12) in order to generate a roughened surface,
 a tool receiver (2), designed to interact with a machining tool, and
 a tool tip (6) opposite the tool receiver (2) in the axial direction,
 wherein a further radial cutting head (16) is arranged for finishing the inner surface (8) of the cylindrical bore (9) in the axial direction between the tool receiver (2) and the radial cutting head (7) for roughening the inner surface (8) of the cylindrical bore (9), and
 wherein at least one flushing medium (14) is provided with a respective flushing medium outlet (15, 17) corresponding to the radial cutting head (7) and the further radial cutting head (16), wherein the flushing medium outlet (15), which corresponds to the radial cutting head (7) for roughening the inner surface (8) of the cylindrical bore (9), is formed with a directional component in the direction of the tool tip (6), and the flushing medium outlet (17) which corresponds to the radial cutting head (16) for finishing the inner surface (8) of the cylindrical bore (9) is formed with a directional component in the direction of the tool receiver (2).

12. The tool (1) according to claim 11, wherein the two radial cutting heads (7, 16) are arranged to be offset to one another in the peripheral direction at an angle ($\alpha$) of up to 120°.

13. The tool (1) according to claim 11, having its receiver on a horizontal spindle of a machining tool having at least one horizontal spindle.

14. The tool (1) according to claim 11, wherein the two radial cutting heads (7, 16) are arranged to be offset to one another in the peripheral direction at an angle ($\alpha$) of up to 90°.

15. A tool (1) for roughening an inner surface (8) of a cylindrical bore (9), having
 a radial cutting head (7) for lifting off a shaving (12) and for breaking off the shaving (12), in order to generate a roughened surface,
 a tool receiver (2) designed to interact with a tool machine, and having a tool tip (6) lying opposite the tool receiver (2) in the axial direction,
 wherein a further radial cutting head (16) for finishing the inner surface (8) of the cylindrical bore (9) is arranged in the axial direction between the tool receiver (2) and the radial cutting head (7) for roughening the inner surface (8) of the cylindrical bore (9),
 wherein at least one flushing medium line (14) is provided with a respective flushing medium outlet (15, 17) corresponding to the radial cutting head (7) and the further radial cutting head (16),
 wherein a third radial cutting head (19) for trimming potentially remaining protrusions of shavings (12) is provided which is arranged between the radial cutting head (7) for roughening the inner surface (8) of the cylindrical bore (9) and the tool tip (6) in the axial direction, and which is arranged to be offset to each of the two other radial cutting heads (7, 16) in the peripheral direction, wherein the third radial cutting head (19) is formed without a flushing medium supply.

16. The tool (1) according to claim 15, wherein all three radial cutting heads (7, 16, 19) are arranged to be offset to one another in the peripheral direction at an angle ($\alpha+\beta$) of at most between the radial cutting heads (7, 16, 19) of 120°.

17. The tool (1) according to claim 15, wherein the flushing medium outlet (15), which corresponds to the radial cutting head (7) for roughening the inner surface (8) of the cylindrical bore (9), is formed with a directional component in the direction of the tool tip (6), and the flushing medium outlet (17), which corresponds to the radial cutting head (16) for finishing the inner surface (8) of the cylindrical bore (9), is formed with a directional component in the direction of the tool receiver (2).

18. The tool (1) according to claim 15, wherein all three radial cutting heads (7, 16, 19) are arranged to be offset to one another in the peripheral direction at an angle ($\alpha+\beta$) between the two outer-lying radial cutting heads (7, 16, 19) of up to 90°.

* * * * *